Jan. 3, 1933.  J. LATZKO ET AL  1,893,421
INDICATING AND RECORDING APPARATUS
Original Filed Nov. 21, 1928   2 Sheets-Sheet 2
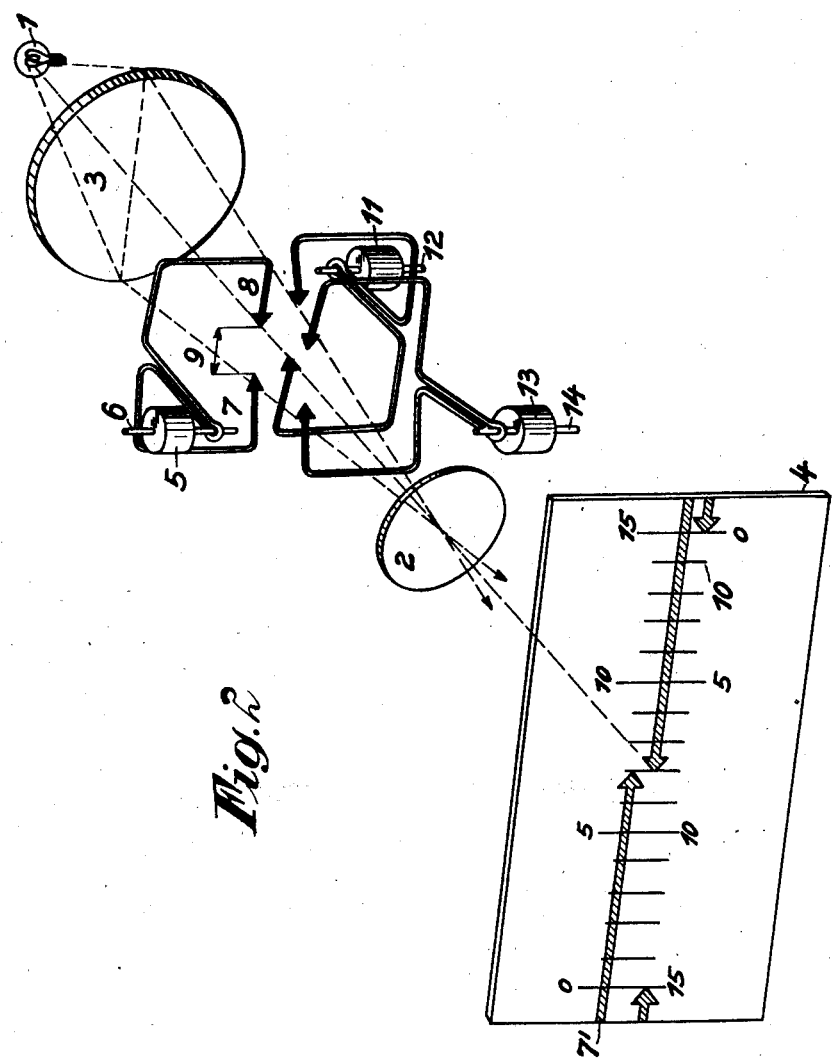
INVENTORS
Johann Latzko,
Otto Plechl.
BY Munn & Co.
ATTORNEYS Patented Jan. 3, 1933

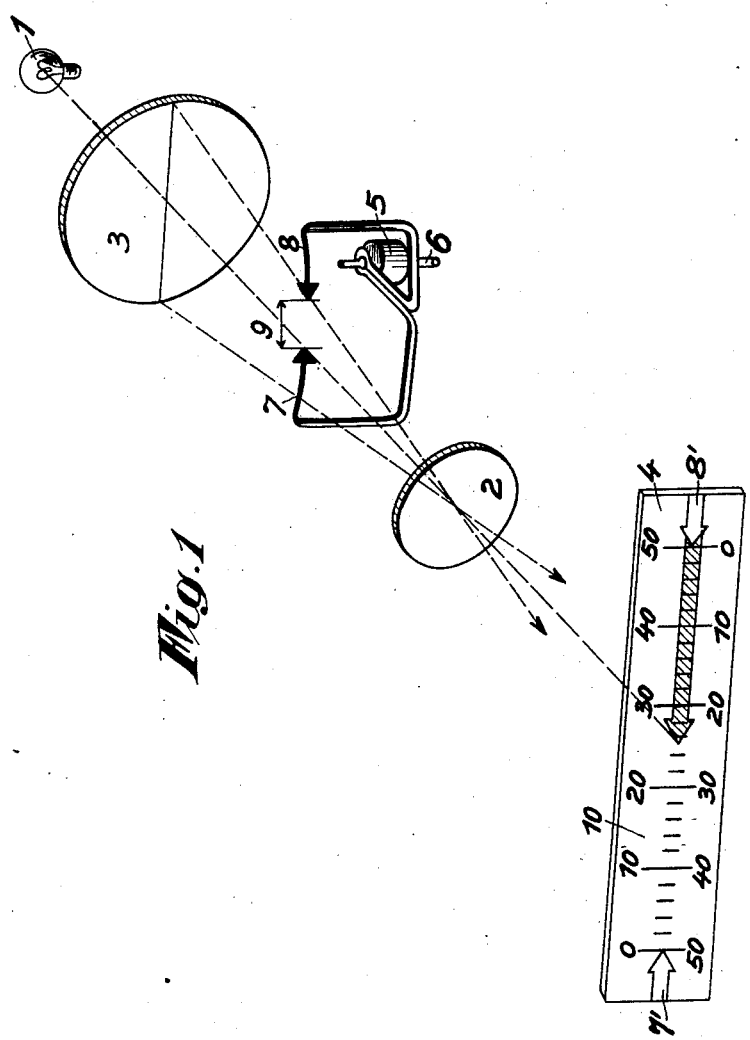

1,893,421

UNITED STATES PATENT OFFICE

JOHANN LATZKO, OF VIENNA, AND OTTO PLECHL, OF PFAFFSTATTEN, AUSTRIA, ASSIGNORS TO OESTERREICHISCHE BROWN-BOVERI WERKE A. G., OF VIENNA, AUSTRIA, A COMPANY OF AUSTRIA

INDICATING AND RECORDING APPARATUS

Original application filed November 21, 1928, Serial No. 321,022, and in Austria November 22, 1927. Divided and this application filed April 10, 1931. Serial No. 529,270.

The invention relates to a recording apparatus and more particularly to an electric measuring apparatus on the indicating surface of which an optical projection either light on dark or dark on light is produced.

While in our said application recording apparatuses are disclosed in which the measuring system has only one direction of reading and consequently to each measuring system only one pointer, preferably arrow shaped, is associated, our present invention has for its subject matter a construction in which to each measuring apparatus is associated at least one body at least part of which is opaque, such body comprising two parts substantially in alignment and separated from each other by a blank space, but rigidly connected with each other mechanically and in which an optical projection apparatus projects an image of such body or bodies on a translucent surface on which a scale appears.

This application is a division of our application filed November 21st, 1928 Ser. No. 321,022.

In the drawings Figure 1 is a perspective view of the simplest embodiment of the improved apparatus, utilizing only one pointer.

Figure 2 is a similar view of a modification of the apparatus employing a plurality of pointers.

In apparatus in which positive and negative values of the quantity measured have to be distinguished and therefore the measuring apparatus rotates in a positive and a negative direction relatively to the position of rest, the invention permits to particularly nicely distinguish positive and negative values measured. One of the two pointer images associated with one sign of the value measured appearing in the field of the scale and thus indicating at once not only the value measured as such, but also the sign. With this purpose in view the scale is provided with two numberings progressing in opposite directions as shown in the drawings.

1 is the source of light, 2 is the projecting lens and 3 the condensing lens of a projection apparatus. The front wall of the indicating apparatus is provided with an opening for a plate 4 made of translucent material such for instance as a frosted glass plate on which a scale appears. This scale can be etched or otherwise made on the frosted plate or may be projected onto the same as is well known in the art. 5 is a measuring apparatus, for instance a Ferraris drum, indicating certain electric quantities. On the axis 6 of this drum is mounted an indicating body consisting of two arrow shaped parts 7, 8 substantially in alignment and separated from each other by a blank space 9, but rigidly connected with each other mechanically.

The use of optical means makes it possible to make the scale surface plane and to substitute for the mechanical guides heretofore used, which guides are lacking in reliability and accuracy, optical guiding means entirely free from inertia and friction.

Preferably the arrangement is such that in the zero position of the measuring instrument the projection of the blank space extends over the whole length of the associated scale as shown in the drawings in connection with the scale 10.

If a plurality of values measured has to be indicated a plurality of pointers may be arranged in the same pencil of light and may be projected on the same scale surface. Apart from the cheapness and economy of space this arrangement may be advantageously used when a plurality of values measured is to be indicated which are in some relation to or have to be compared with each other.

Fig. 2 illustrates such an embodiment of our invention in which three values are measured and in which therefore three double pointers are used. This embodiment relates to a three phase current system in which the indications of three wattmeters, for example, are projected by means of double pointers. A scale common to all three wattmeters is provided on the screen along which move the projected images of the three double pointers, the said double pointers being associated each to one wattmeter.

The arrangement of a plurality of measuring instruments must be such that the projections of the double pointers will be perfectly sharp throughout their length. As will be seen the desired effect may be obtained, for instance in Fig. 2, by locating all the axes for the rotary movements of the pointers in a plane of symmetry of the projection apparatus and at right angles to the direction of projection. Preferably two of these axes, (for instance 6 and 14) will be always in alignment. If more than two pointer systems have to be provided (Fig. 2 shows three) a particularly simple arrangement of the pointers may be obtained for instance and also equal angles of rotation for equal movements of the shadow by arranging the axes of the pointers (for instance 12 and 14) in pairs symmetrically to the common tangential plane of the cylindrical surfaces in which take place the movements of the pointers.

The objective produces more sharp images of pointers which move along paths concave relatively to the objective. If pointers having a concave curvature (those of the axes 6 and 14), and pointers having a convex curvature (the pointer connected to the axis 12), have to be projected simultaneously, the pointers having a convex path relatively to the objective are preferably arranged in the middle of the pencil of light so that the lack of sharpness due to the curvature of the object is not still further increased by the lack of sharpness of the edges. Thus a practically sufficient sharpness may be obtained for all the pointer images.

If the values measured by the various systems have to be compared with each other their characteristics have to be so adjusted that the lengths of the projections or shadows permit comparing the values measured. This must be for instance the case if by the apparatus the symmetry or the asymmetry of a distributing system comprising a plurality of mains (polyphase system) has to be ascertained. If, say the currents of the three phases of a three phase system have to be measured the apparatus has to be so adjusted that equal lengths of the arrows in the three phases correspond with practically sufficient accuracy to equal values measured. But not only values measured of the same nature may be compared with each other, but if three values measured are in a functional relation, from the relation of two of such values the third may be determined. In such multi-apparatus not all the pointers need be used to indicate values measured but one or more pointers may be used to indicate values desired and which may be adjusted either directly or by transmission from a distance. The attendant at the bus board or at the engines or at the boilers has then to take care to make the value measured as nearly equal as possible to the value commanded.

The method hereinbefore described for indicating values measured is of course not limited to electric quantities alone, it is on the contrary possible to indicate a great variety of quantities measured according to the measuring apparatus used.

What we claim is:

1. An indicating apparatus comprising a surface at least part of which is translucent, at least one body at least part of which is opaque, the said body comprising two parts substantially in alignment and separated from each other by a blank space but rigidly connected with each other, an optical projection apparatus adapted to project an image of such body on the translucent part of said surface and means for operatively connecting the said body with a measuring apparatus.

2. An indicating apparatus comprising a surface at least part of which is translucent, at least one body at least part of which is opaque, such body comprising two arrow shaped parts substantially in alignment and separated from each other by a blank space, but rigidly connected with each other, an optical projection apparatus adapted to project an image of such body on the translucent part of the said surface, and means for operatively connecting the said body with a measuring apparatus.

3. An indicating apparatus comprising a surface at least part of which is translucent and has a scale applied thereto, at least one body at least part of which is opaque, such body comprising two parts substantially in alignment and separated from each other by a blank space but rigidly connected with each other, an optical projection apparatus adapted to project an image of said body on the translucent part of said surface, and means for operatively connecting the said body with a measuring apparatus, whereby in the zero position of the measuring apparatus the projection of the blank space extends over the whole length of the scale.

In testimony whereof we affix our signatures.

JOHANN LATZKO.
OTTO PLECHL.